United States Patent Office.

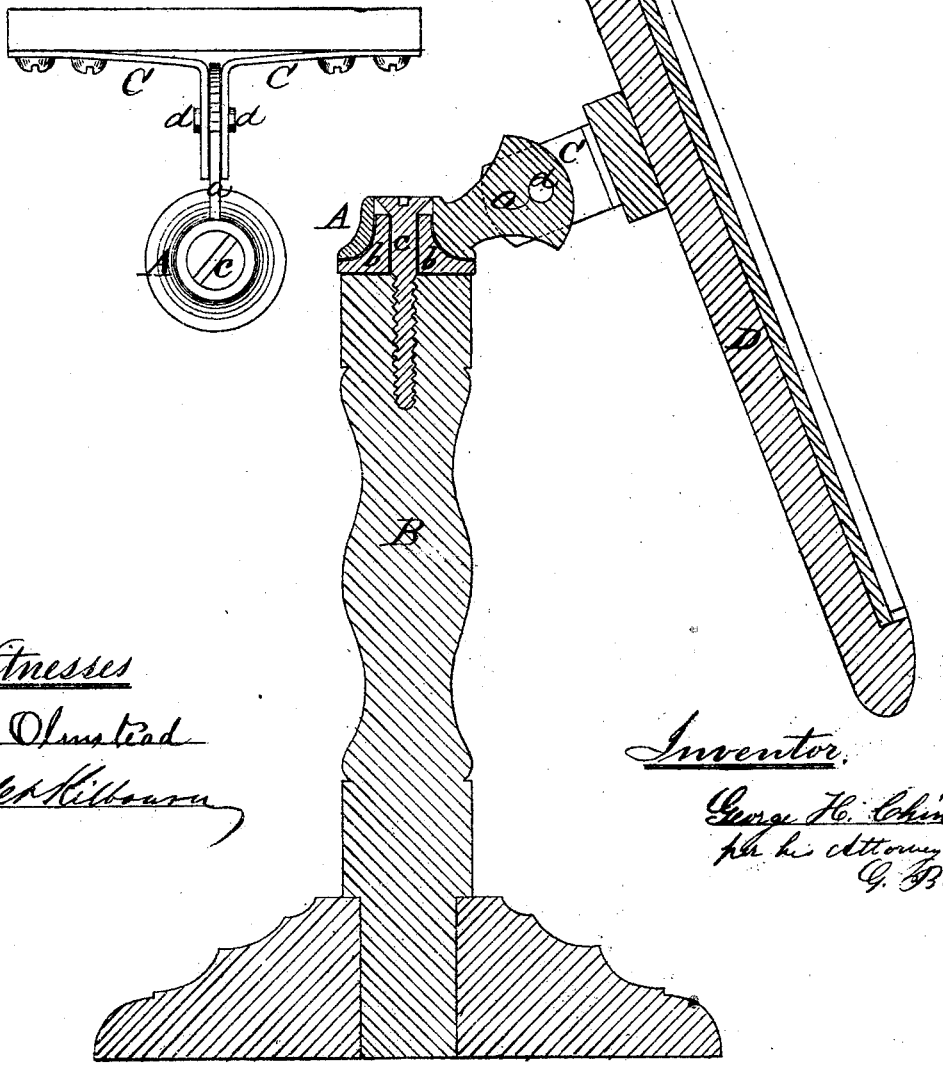

GEORGE H. CHINNOCK, OF NEW YORK, N. Y.

Letters Patent No. 94,712, dated September 14, 1869.

IMPROVED TOILET-MIRROR.

The Schedule referred to in these Letters Patent and making part of the same

*To all whom it may concern:*

Be it known that I, GEORGE H. CHINNOCK, of the city, county, and State of New York, have invented a new and improved Toilet-Mirror; and I do hereby declare that the following is a full, clear, and exact description of the construction and operation of the same, reference being had to the accompanying drawings, making a part of this specification, in which—

Figure 1 is a sectional view.

Figure 2 is a view in detail of devices connecting mirror with post or pillar of stand.

Like letters in both figures of the drawings indicate like parts.

My invention consists of a toilet-mirror, adjustable and self-holding at any angle or position desired, without the use of set-screws, as heretofore required, by means of the friction of spring-plates, so arranged and attached centrally to the back of the mirror as to embrace the projecting arm of a cap having a swivel-motion on the post or pillar of the stand, by which the mirror may be turned around without turning the stand, the said arm being pivoted eccentrically to the spring-plates.

I construct my toilet-mirror as follows:

A is the cap, provided with the projecting arm $a$, and fitting over a head-piece, $b$, resting on the top of the post B of the stand, and secured thereto by a pivot-screw, $c$, so that it will have a swivel-motion thereon.

C C are flat steel spring-plates, having angular ends embracing the projecting arm $a$, which, having a curved or semicircularly-shaped head, is attached eccentrically thereto by a pivot, $d$, the mirror turning on this pivot, the springs being attached centrally to the back of the mirror D by screws, in such a manner as that they will press upon the sides of the arm, and cause sufficient friction to hold the mirror when adjusted at the point desired.

The object of pivoting the arm eccentrically to the spring-plates is, that as the mirror is placed in or nearly in a horizontal position, the friction of the springs on the sides of the arm will not be so great, because the springs present less surface for friction at that point than when the mirror is turned down toward a perpendicular position; hence, as the angle of the mirror is increased from the former to the latter position the greater will be the friction, and the more tightly will the mirror be held.

But sufficient friction may be obtained from a simple pressure of the springs on the sides of the arm, without attaching the arm eccentrically, but concentrically. In that case the friction of the springs would be uniform, whether the angle of the mirror be greater or less, but the mirror would not be so tightly held as in the other case, where the friction is greater at one point than at another; therefore it may be found desirable to pivot the arm eccentrically. In that event, I contemplate using either method, as above described, as I may deem most practicable.

It is obvious that this feature of holding the mirror by friction can be done with the projecting arm of the cap attached rigidly to the top of the post of the stand; therefore I do not intend to limit this feature to an arm having a swivel-motion thereon, but contemplate using the arm either way, as above described, the only difference being, the inconvenience of turning the stand is avoided by the swivel-motion of the arm.

It will be seen that no set-screws are used, as required in most of toilet-mirrors, in which, every time the mirror is to be adjusted, one hand is needed to hold the mirror while the other is adjusting the screws.

This inconvenience is obviated by dispensing with set-screws, and simply giving the mirror a slight push with the hand, when the same will be adjusted and held at the point desired by means of friction, as described, thus rendering the mirror more simple, and less expensive in cost of construction.

Having thus fully described my invention,

What I claim therein as new, and desire to secure by Letters Patent, is—

The toilet-mirror, adjustable by means of springs C C, in combination with the projecting arm of the cap A, having a swivel-motion on the post of the stand, substantially as described.

GEO. H. CHINNOCK.

Witnesses:
J. F. OLMSTEAD,
JACOB F. HENRY.